US008855887B2

(12) United States Patent
Iwao et al.

(10) Patent No.: US 8,855,887 B2
(45) Date of Patent: Oct. 7, 2014

(54) COASTING CONTROL DEVICE

(75) Inventors: Nobuyuki Iwao, Fujisawa (JP); Yasushi Yamamoto, Fujisawa (JP); Kazuhiko Kobayashi, Yokohama (JP); Hiroyuki Arai, Yokohama (JP); Kouhei Takama, Yokohama (JP)

(73) Assignees: Isuzu Motors Limited, Tokyo (JP); Transtron Inc., Yokohama-Shi (JP)

( * ) Notice: Subject to any disclaimer, the term of this patent is extended or adjusted under 35 U.S.C. 154(b) by 0 days.

(21) Appl. No.: 13/812,964

(22) PCT Filed: Jul. 7, 2011

(86) PCT No.: PCT/JP2011/065565
§ 371 (c)(1),
(2), (4) Date: Jan. 29, 2013

(87) PCT Pub. No.: WO2012/014652
PCT Pub. Date: Feb. 2, 2012

(65) Prior Publication Data
US 2013/0131948 A1 May 23, 2013

(30) Foreign Application Priority Data
Jul. 30, 2010 (JP) .................................. 2010-172562

(51) Int. Cl.
- *B60T 8/32* (2006.01)
- *F16H 45/02* (2006.01)
- *B60W 10/02* (2006.01)
- *B60W 30/18* (2012.01)
- *F16D 48/06* (2006.01)
- *F16D 48/02* (2006.01)

(52) U.S. Cl.
CPC ........ *B60W 10/02* (2013.01); *F16D 2500/7105* (2013.01); *F16D 2048/023* (2013.01); *F16D 2500/5085* (2013.01); *F16D 2048/0254* (2013.01); *F16D 2500/70424* (2013.01); *F16D 2500/508* (2013.01); *B60W 30/18145* (2013.01); *F16D 48/066* (2013.01); *B60W 30/18072* (2013.01); *F16D 2500/51* (2013.01)
USPC ............................................ 701/93; 477/169

(58) Field of Classification Search
USPC ............................................ 701/93; 477/169
See application file for complete search history.

(56) References Cited

U.S. PATENT DOCUMENTS 4,702,843 A * 10/1987 Oswald et al. ............. 280/5.507
5,642,283 A * 6/1997 Schulz et al. ................... 701/51

(Continued)

FOREIGN PATENT DOCUMENTS

| JP | 6-346954 | 12/1994 | |
| JP | 06346954 A * | 12/1994 | ............. F16H 61/00 |

(Continued)

OTHER PUBLICATIONS

Written Opinion of the International Searching Authority mailed Aug. 9, 2011 in corresponding International Application No. PCT/JP2011/065565.

(Continued)

*Primary Examiner* — Thomas G Black
*Assistant Examiner* — Tyler Paige
(74) *Attorney, Agent, or Firm* — Staas & Halsey LLP

(57) ABSTRACT

A coasting control device capable of avoiding coasting control during turning is provided. A turning recognition unit that recognizes that a vehicle is turning and a unit for prohibiting coasting control during turning that prohibits coasting control when the turning recognition unit recognizes that the vehicle is turning are provided.

10 Claims, 6 Drawing Sheets

(56) References Cited

U.S. PATENT DOCUMENTS

| | | | |
|---|---|---|---|
| 6,665,603 B2 * | 12/2003 | Jindo et al. | 701/96 |
| 6,966,867 B2 * | 11/2005 | Tajima et al. | 477/7 |
| 7,264,574 B2 * | 9/2007 | Tohta et al. | 477/169 |
| 7,894,964 B2 * | 2/2011 | Murayama et al. | 701/54 |
| 8,195,366 B2 * | 6/2012 | McCabe et al. | 701/50 |
| 2004/0060756 A1 * | 4/2004 | Sekiguchi | 180/168 |
| 2006/0231301 A1 * | 10/2006 | Rose et al. | 180/19.1 |
| 2013/0158838 A1 * | 6/2013 | Yorke et al. | 701/103 |

FOREIGN PATENT DOCUMENTS

| | | | |
|---|---|---|---|
| JP | 8-67175 | 3/1996 | |
| JP | 08067175 A * | 3/1996 | B60K 41/02 |
| JP | 2001-304305 | 10/2001 | |
| JP | 2001304305 A * | 10/2001 | F16D 48/02 |
| JP | 2004-17721 | 1/2004 | |
| JP | 2006-342832 | 12/2006 | |
| JP | 2010-23803 | 2/2010 | |
| JP | 2010023803 A * | 2/2010 | |

OTHER PUBLICATIONS

International Search Report of Corresponding PCT Application PCT/JP2011/065565 mailed Aug. 9, 2011.

Patent Abstracts of Japan, Publication No. 06-346954, Published Dec. 20, 1994.

Patent Abstracts of Japan, Publication No. 08-067175, Published Mar. 12, 1996.

Patent Abstracts of Japan, Publication No. 2001-304305, Published Oct. 31, 2001.

Patent Abstracts of Japan, Publication No. 2010-023803, Published Feb. 4, 2010.

Patent Abstracts of Japan, Publication No. 2006-342832, Published Dec. 21, 2006.

Patent Abstracts of Japan, Publication No. 2004-017721, Published Jan. 22, 2004.

* cited by examiner

COASTING CONTROL DEVICE

CROSS-REFERENCE TO RELATED APPLICATION

This application claims the benefit of Japanese Patent Application No. 2010-172562, filed on Jul. 30, 2010, the contents of which is incorporated herein by reference, which serves as priority for PCT Application No. PCT/JP2011/065565, filed Jul. 7, 2011.

TECHNICAL FIELD

The present invention relates to a coasting control device that suppresses fuel consumption by disengaging a clutch during running and returning an engine to an idle state, and more particularly to a coasting control device capable of avoiding coasting control during turning.

BACKGROUND ART

When the accelerator pedal of a vehicle is pressed while the clutch is disengaged, the accelerator is opened to cause the engine to run at "idle" and the engine RPM is stabilized at the engine RPM corresponding to the accelerator opening degree. At that point of time, the driving force generated by the engine and the internal resistance (friction) of the engine are in equilibrium and the engine output torque is 0. That is, the engine does no work for the outside the engine and fuel is wasted. Assuming that the engine runs at idle at the engine RPM of 2000 rpm, a driver can hear loud engine noise and recognize that a considerable amount of fuel is wasted.

The engine does no work for the outside not only during idling caused by disengagement of the clutch as described above but also while the vehicle is in motion. That is, the engine only revolves at an engine RPM corresponding to the accelerator opening degree as in idling and does not contribute to acceleration or deceleration of the vehicle. At this time, the fuel is consumed only in causing the engine to revolve uselessly, which is highly wasteful.

SUMMARY OF INVENTION

Technical Problem

Roads include curves, each having a constant radius of curvature or a constant change rate of radius of curvature as a junction (ramp) on a highway or the like, on which high-speed running is possible. When a vehicle is turning at a high speed on such curve, coasting control is not preferable even if coasting conditions are met. That is because, lateral acceleration caused by a centrifugal force, that is, a so-called lateral G-force acts on a turning vehicle and causes an unstable element for vehicle behaviors, and thus, stabilization control such as ABS (Ant-Lock Braking System) control or the like has been executed. While such delicate vehicle control is being executed, it is necessary to connect the clutch so that the engine driving force or the engine brake can be used for stabilization of the vehicle behaviors.

SUMMARY OF THE INVENTION

The present invention has an object to solve the above problem and to provide a coasting control device capable of avoiding coasting control during turning.

The present invention has been made to achieve the above object and is provided with a coasting control execution unit that disengages a clutch in a driving situation in which the engine does no work for the outside and lowers the engine RPM so as to start coasting control, a turning recognition unit that recognizes that the vehicle is turning, and a unit for prohibiting coasting control during turning that prohibits coasting control when the turning recognition unit recognizes that the vehicle is turning.

The turning recognition unit may recognize that the vehicle is turning from a difference in rotation speeds between right and left wheels.

The turning recognition unit may recognize that the vehicle starts turning when the difference in rotation speeds between the right and left wheels exceeds a first threshold value and recognize that the vehicle terminates turning when the difference in rotation speeds between the right and left wheels lowers to a second threshold value, which is smaller than the first threshold value, or less.

Provided with a coasting control determination map to be referred to by a clutch rotation speed and an accelerator opening degree, the coasting control execution unit may start coasting control by disengaging the clutch and lowering the engine RPM when plotted points of the clutch rotation speed and the accelerator opening degree on the coasting control determination map are within a region capable of coasting control, an accelerator pedal operation speed is within a predetermined range, and plotted points of the clutch rotation speed and the accelerator opening degree pass a coasting control threshold line in a direction where the accelerator opening degree decreases and terminate coasting control when the accelerator pedal opening speed goes out of the predetermined range or the plotted points go out of the region capable of coasting control.

The present invention exerts the following excellent effect. Coasting control during turning can be avoided.

DETAILED DESCRIPTION

Preferred embodiments of the present invention will be described below on the basis of the attached drawings.

Figure 1:
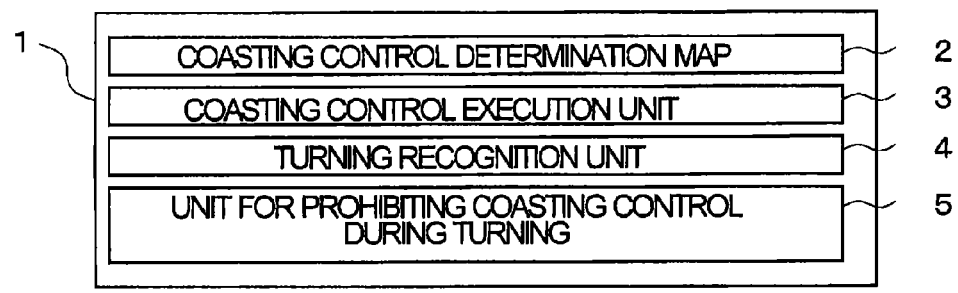
FIG. 1 is a block configuration diagram of a coasting control device of the present invention.

As illustrated in FIG. 1, a coasting control device 1 according to the present invention is provided with a coasting control execution unit 3 which disengages a clutch in a driving situation in which the engine does no work for the outside and lowers the engine RPM so as to start coasting control, a turning recognition unit 4 which recognizes that a vehicle is turning, and a unit 5 for prohibiting coasting control during turning that prohibits coasting control when the turning recognition unit recognizes that the vehicle is turning.

In more detail, the coasting control device 1 is provided with a coasting control determination map 2 based on a clutch rotation speed and an accelerator opening degree, the coasting control execution unit 3 starts coasting control by disengaging the clutch and lowering the engine RPM when plotted points of the clutch rotation speed and the accelerator opening degree on the coasting control determination map 2 are within a region capable of coasting control, an accelerator pedal operation speed is within a predetermined range, and plotted points of the clutch rotation speed and the accelerator opening degree pass a coasting control threshold line in a direction where the accelerator opening degree decreases and terminates coasting control when the accelerator pedal opening speed goes out of the predetermined range or the plotted points go out of the region capable of coasting control.

The turning recognition unit 4 reads information of rotation speeds of right and left wheels from an ABS control unit conventionally mounted on a vehicle and recognizes that the vehicle is turning from a difference in rotation speeds between the right and left wheels. In addition, a vehicle on which a steering sensor which detects an operation angle of a steering shaft is mounted, a vehicle on which a yaw rate sensor which detects a yaw angle of the vehicle is mounted, a vehicle on which a G-force sensor which detects lateral acceleration of the vehicle is mounted and the like are capable of recognition that the vehicle is turning from these sensor outputs.

The coasting control determination map 2, the coasting control execution unit 3, the turning recognition unit 4, and the unit 5 for prohibiting coasting control during turning constituting the coasting control device 1 are preferably mounted on an ECU (not shown), for example.

Each unit of a vehicle on which the coasting control device 1 of the present invention is mounted will be described.

Figure 2:
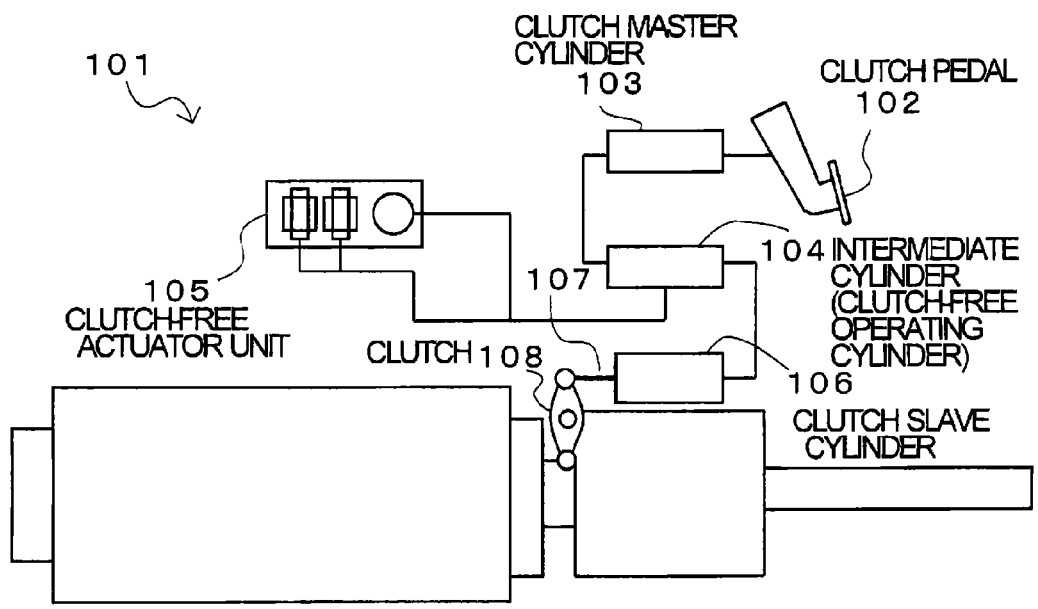
FIG. 2 is a block configuration diagram of a clutch system of a vehicle to which the coasting control device of the present invention is applied.

As illustrated in FIG. 2, a clutch system 101 of a vehicle on which the coasting control device 1 of the present invention is mounted is a manual and automatic dual-mode type by an ECU control. A clutch master cylinder 103 mechanically connected to a clutch pedal 102 supplies operation oil to an intermediate cylinder (also referred to as clutch-free operating cylinder and switching cylinder) in accordance with a stepping-in/returning operation of the clutch pedal 102 by a driver. On the other hand, a clutch-free actuator unit 105 controlled by the ECU (not shown) supplies operation oil to an intermediate cylinder 104 in accordance with an instruction of clutch engagement/disengagement. The intermediate cylinder 104 supplies operation oil to a clutch slave cylinder 106. A piston 107 of the clutch slave cylinder 106 is mechanically connected to a movable unit of a clutch 108.

Figure 3:
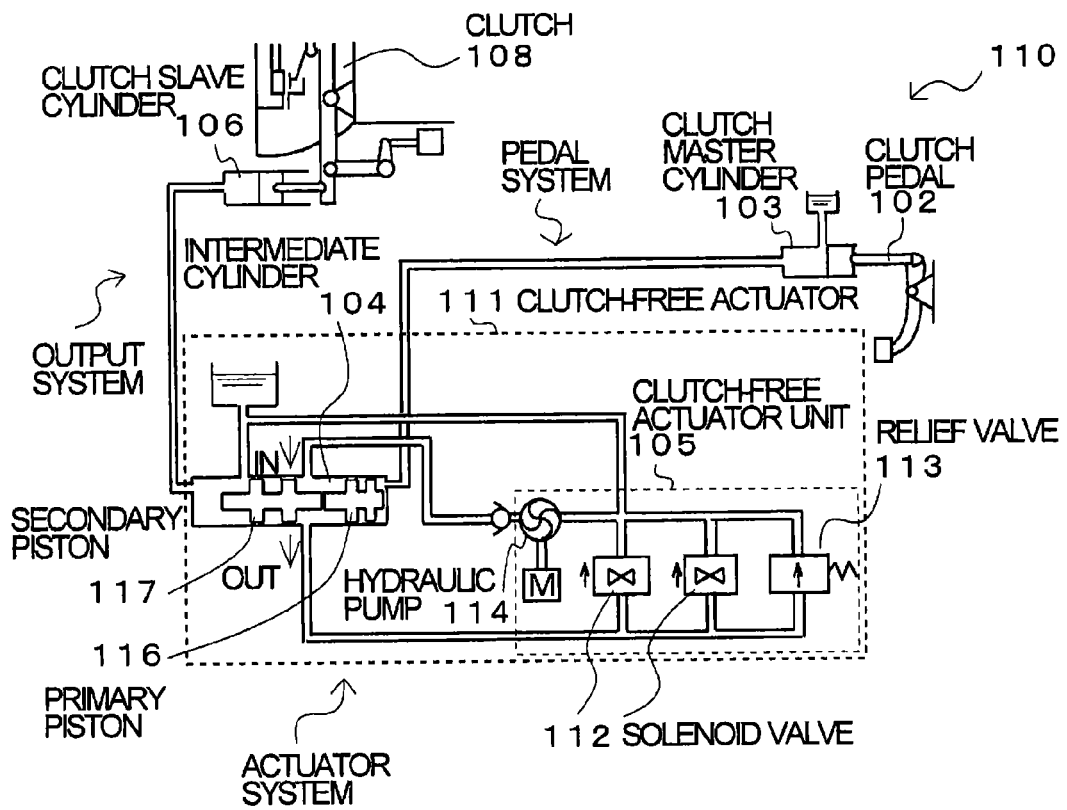
FIG. 3 is a configuration diagram of an actuator which realizes the clutch system in FIG. 2.

As illustrated in FIG. 3, the actuator 110 is provided with a clutch-free actuator 111. The clutch-free actuator 111 is provided with the intermediate cylinder 104 and the clutch-free actuator unit 105. The clutch-free actuator unit 105 is provided with a solenoid valve 112, a relief valve 113, and a hydraulic pump 114. The intermediate cylinder 104 is composed of a primary piston 116 and a secondary piston 117 arranged in series, and when the primary piston 116 strokes due to the operation oil from the clutch master cylinder 103, the secondary piston 117 is configured to stroke with that. The intermediate cylinder 104 is configured such that the secondary piston 117 strokes due to the operation oil form the clutch-free actuator unit 105. In accordance with the stroke of the secondary piston 117, operation oil is supplied to the clutch slave cylinder 106. With this configuration, when a manual operation is made, clutch engagement/disengagement according to the manual operation is performed with priority, and clutch engagement/disengagement according to the ECU control is performed when the manual operation is not being made.

The coasting control device 1 of the present invention can be applied also to a clutch system only with the automatic type and not having the manual type.

Figure 4:
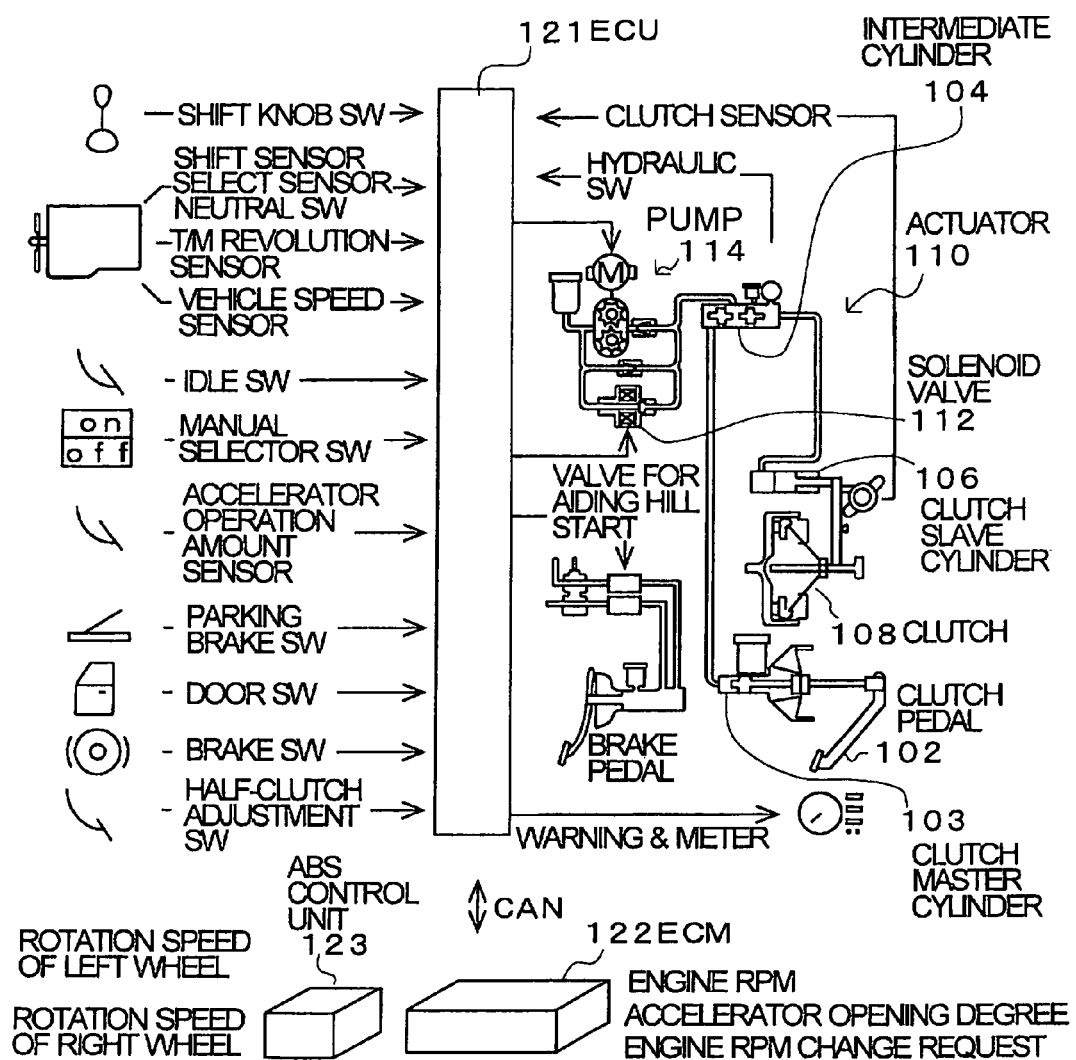
FIG. 4 is an input/output configuration diagram of a vehicle to which the coasting control device of the present invention is applied.

As illustrated in FIG. 4, in the vehicle, an ECU 121 which mainly controls a transmission/clutch, an ECM 122 which mainly controls an engine, and an ABS control unit 123. To the ECU 121, input signal lines of a shift knob switch, a shift sensor of the transmission, a select sensor, a neutral switch, a T/M revolution sensor, a vehicle speed sensor, an idle switch, a manual selector switch, a parking brake switch, a door switch, a brake switch, a half-clutch adjustment switch, an accelerator operation amount sensor, a clutch sensor, and an oil pressure switch are connected. Moreover, to the ECU 121, output signal lines of a motor of the hydraulic pump 114 of the clutch system 101, the solenoid valve 112, a valve for aiding hill start, and warning & meter are connected. To the ECM 122, various input signal lines and output signal lines used for engine control, though not shown, are connected. The ECM 122 can transmit signals of an engine RPM, an accelerator opening degree, and an engine RPM change request to the ECU 121 through CAN (Controller Area Network) transmission path. The ABS control unit 123 can transmit signals of a rotation speed of each of the right and left wheels, a steering shaft operation angle, a yaw angle, and lateral acceleration to the ECU 121 through the CAN transmission path.

The clutch rotation speed used in the present invention is the number of rotations of clutch on the driven side and is equal to the number of rotations of the input shaft of the transmission. The clutch rotation speed can be acquired from the number of input shaft rotations detected by an input shaft rotation number sensor, not shown. Alternatively, a clutch rotation speed can be acquired by using a gear ratio of the current gear position from a vehicle speed detected by the vehicle speed sensor. The clutch rotation speed indicates the engine RPM corresponding to the vehicle speed.

An operation of the coasting control device 1 of the present invention will be described below.

Figure 5:
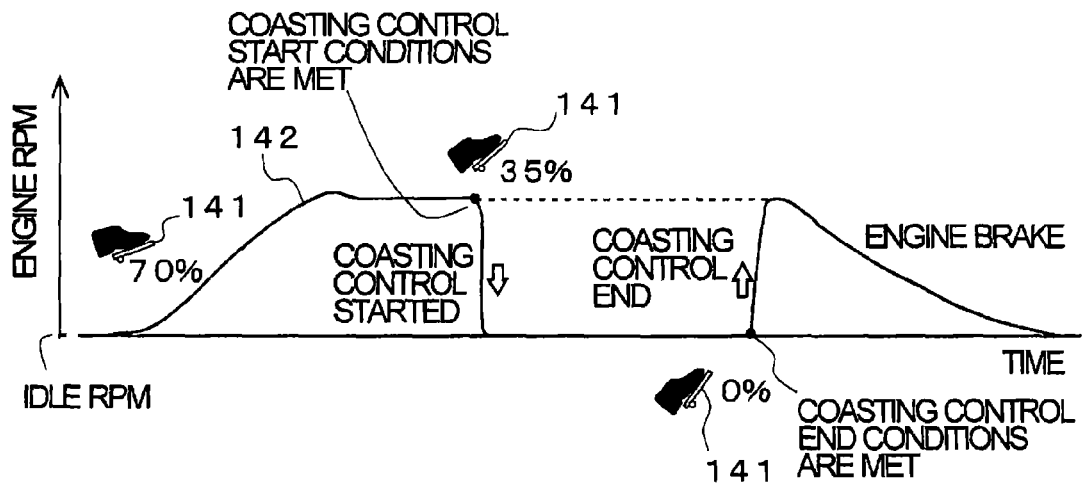
FIG. 5 is a conceptual operation diagram illustrating an overview of coasting control.

The operation principle of coasting control will be described with reference to FIG. 5. The horizontal axis represents time and a flow of control and the vertical axis represents the engine RPM. While an accelerator pedal 141 is largely pressed down from the idle rotation state and the accelerator opening degree stays at 70%, the engine RPM 142 increases to accelerate the vehicle. When the engine RPM 142 stabilizes and the amount of depression of the accelerator pedal 141 decreases to reduce the accelerator opening degree to 35%, conditions for starting coasting control, which will be described later, are considered to be satisfied. When coasting control is started, the clutch is disengaged and the engine RPM 142 is controlled to the idle RPM. The vehicle runs on coasting control. Assume that subsequently the accelerator pedal is released and the accelerator opening degree decreases to 0% or other conditions for terminating coasting control are satisfied. Upon termination of coasting control, the engine revolution is controlled and the clutch is engaged. Since the accelerator opening degree is 0% in this example, an engine braking state is entered to decelerate the vehicle.

If coasting control were not performed, the engine would be maintained at a high RPM as indicated by the dashed line during coasting control and fuel would be wasted accordingly. Coasting control reduces the engine RPM 142 to the idle RPM, thereby saving fuel.

Figure 6:
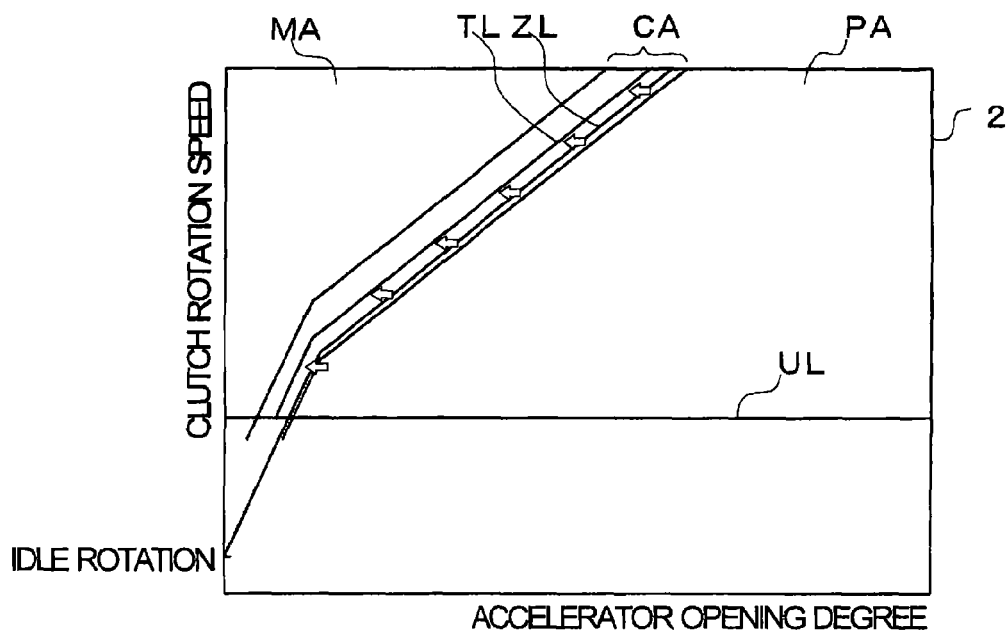
FIG. 6 is a graph image diagram of a coasting control determination map.

FIG. 6 illustrates a graph image of the coasting control determination map 2.

The coasting control determination map 2 is a map with the horizontal axis representing the accelerator opening degree and the vertical axis representing the clutch rotation speed. The coasting control determination map 2 can be divided into two regions: a negative region MA where the engine output torque is negative and a positive region PA where the engine output torque is positive. The negative region MA is a region where the engine output torque is negative because the friction of the engine is greater than a demanded engine torque. The positive region PA is a region where the engine output torque is positive because the demanded engine torque is greater than the friction of the engine. The engine output torque zero line ZL which is a boundary between the negative region MA and the positive region PA represents a state in which the engine is doing no work for the outside the engine and fuel is being wasted as described in the Background Art.

In the present embodiment, the coasting control threshold line TL is set slightly to the left of the engine output torque zero line ZL (on the side where the accelerator opening degree is small) on the coasting control determination map 2. A coasting control available region CA having a finite width including the coasting control threshold line TL is set between the negative region MA and the position region PA on the coasting control determination map 2. A clutch rotation speed lower threshold line UL is set on the coasting control determination map 2. The lower threshold line UL defines the lower threshold value of the clutch rotation speed independently of the accelerator opening degree. As illustrated, the lower threshold line UL is set slightly above the clutch rotation speed in the idle state.

The coasting control device 1 starts coasting control when all of the following four coasting control start conditions are satisfied.

(1) The speed of operation of the accelerator pedal is within the thresholds.

(2) Plotted points of the clutch rotation speed and the accelerator opening degree pass the coasting control threshold line TL in the accelerator returning direction on the coasting control determination map 2.

(3) Points plotted on the coasting control determination map 2 are in the coasting control available region CA.

(4) The clutch rotation speed is above or on the lower threshold line UL on the coasting control determination map 2.

The coasting control device 1 ends coasting control when at least one of the following two coasting control end conditions is satisfied.

(1) The speed of operation of the accelerator pedal is out of the thresholds.

(2) Points plotted on the coasting control judgment map 2 are out of the coasting control available region CA.

The operation of the coasting control device 1 following the coasting control determination map 2, the coasting control start conditions, and the coasting control end conditions will be described.

The coasting control execution unit 3 monitors the accelerator opening degree on the basis of the accelerator pedal operation amount and the clutch rotation speed acquired from the input shaft rotation number or the vehicle speed all the time and plots coordinate points of the accelerator opening degree and the clutch rotation speed on the coasting control determination map 2 in FIG. 6. The coordinate points move with elapse of time. At this time, if the coordinate point is present in the coasting control available region CA, the coasting control execution unit 3 determines whether or not to start coasting control. If the coordinate point is not present in the coasting control available region CA, the coasting control execution unit 3 does not determine whether or not to start coasting control.

Subsequently, if the coordinate point passes the coasting control threshold line TL in a direction where the accelerator opening degree decreases, the coasting control execution unit 3 starts coasting control. That is, the coasting control device 1 disengages the clutch and controls the control accelerator opening degree that the ECM 122 instructs to the engine so as to correspond to idling. As a result, the clutch is disengaged, and the engine enters the idle state.

As a moving direction of the coordinate point is illustrated by an arrow in FIG. 6, the direction where the accelerator opening degree decreases is the left direction in illustration. Even if the coordinate point passes the coasting control threshold line TL, if the moving direction of the coordinate point has a component of the right direction in the illustration, the accelerator opening degree increases and thus, the coasting control execution unit 3 does not start coasting control.

The coasting control execution unit 3 monitors the accelerator opening degree and the clutch rotation speed all the time even after the coasting control is started and plots the coordinate points of the accelerator opening degree and the clutch rotation speed on the coasting control determination map 2. If the coordinate point goes out of the coasting control available region CA, the coasting control execution unit 3 ends coasting control.

By the above-described operation, if the accelerator pedal is operated on the stepped-in side, even if the coordinate points of the accelerator opening degree and the clutch rotation speed pass the coasting control threshold line TL, coasting control is not started and only if the accelerator pedal is operated on the returning side, coasting control is started when the coordinate point passes the coasting control threshold line TL, and thus, the driver does not feel a sense of discomfort.

The coasting control execution unit 3 does not start coasting control if the coordinate point is present below the lower threshold line UL (the clutch rotation speed is lower than the lower threshold value). That is because even if the clutch is disengaged when the engine is in the idle state, an effect to suppress fuel consumption cannot be expected much. Thus, the coasting control execution unit 3 starts coasting control only when the coordinate point is present above the lower threshold line UL.

Figure 7:
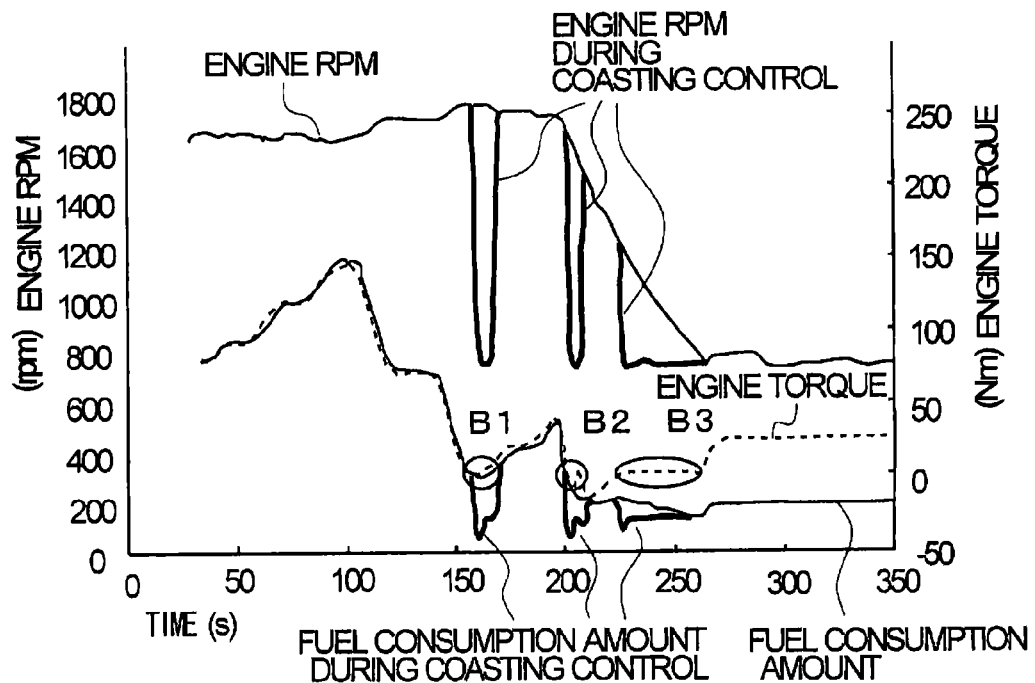
FIG. 7 is a graph illustrating a fuel saving effect of coasting control.

The effect of fuel cost reduction by coasting control will be described by referring to FIG. 7.

First, assume that coasting control is not to be executed. The engine RPM changes within a range of 1600 to 1700 rpm from approximately 30 s to approximately 200 s and lowers from approximately 1700 rpm to approximately 700 rpm (idle RPM) from approximately 200 s to approximately 260 s.

The engine torque increases from approximately 30 s to approximately 100 s but after that, continuously decreases until approximately 150 s. The engine torque is substantially 0 Nm from approximately 150 s to approximately 160 s and increases from approximately 160 s to approximately 200 s but becomes substantially 0 Nm at approximately 200 s. As a result, a period during which the engine torque is substantially 0 Nm occurs at three spots, that is, from approximately 150 s to approximately 160 s (oval B1), from approximately 200 s to approximately 210 s (oval B2), and from approximately 220 s to approximately 260 s (oval B3).

The fuel consumption amount (no vertical axis scale: arranged so as to overlap with the engine torque for convenience) changes substantially in compliance with the change of the engine torque from approximately 50 s to approximately 200 s. Even if the engine torque is substantially 0 Nm, the fuel consumption amount is not 0.

Here, if it is assumed that coasting control is executed, in the period during which the engine torque becomes substantially 0 Nm, the engine rpm is controlled to the idle RPM. In the graph, a line of the engine RPM (bold solid line) during coasting control is indicated as branching from a line of the engine RPM (solid line) when coasting control is not executed. The coating control was executed three times at the ovals B1, B2, and B3. The fuel consumption amount during the period when coasting control is executed falls under the fuel consumption amount when coasting control is not executed, and it is known that the fuel consumption is saved.

Subsequently, a specific setting example of the coasting control determination map 2 will be described.

Figure 8:
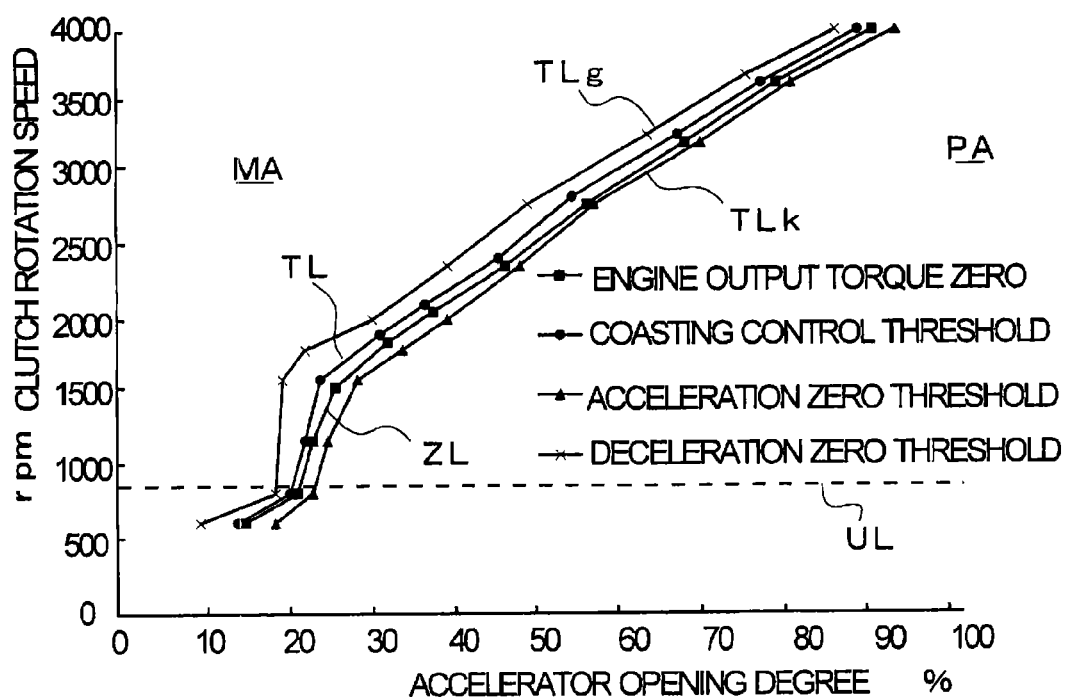
FIG. 8 is a graph illustrating actually measured accelerator opening degree and a clutch rotation speed in order to create the coasting control determination map.

As illustrated in FIG. 8, in order to create the coating control determination map 2, characteristics of the accelerator opening degree and the clutch rotation speed are actually measured, and a graph having the accelerator opening degree on the horizontal axis and the clutch rotation speed (=engine RPM; when the clutch is engaged) on the vertical axis is created. As a result, the actually measured engine output torque zero line ZL can be drawn. The entire left side from the engine output torque zero line ZL is the negative region MA, and the entire right side is the positive region PA.

The coasting control threshold line TL is defined and drawn slightly to the left of the engine output torque zero line ZL. A deceleration zero threshold line TLg is estimated and drawn slightly to the left of the coasting control threshold line TL. An acceleration zero threshold line TLk is estimated and drawn slightly to the right of the engine output torque zero line ZL. A region sandwiched by the deceleration zero threshold line TLg and the acceleration zero threshold line TLk is defined as the coasting control available region CA. The lower threshold line UL is set to 880 rpm in this example.

The deceleration zero threshold line TLg and the acceleration zero threshold line TLk are set to such a degree that the driver does not drive with difficulty, but since it is a matter of human senses and cannot be digitalized in design, it is tuned on an actual vehicle. The coasting control threshold line TL is set at the center between the deceleration zero threshold line TLg and the acceleration zero threshold line TLk.

The graph in FIG. 8 created as above is digitalized (discretized) as appropriate and written in a storage device, and the coasting control determination map 2 that can be used by the coasting control execution unit 3 for its calculation processing can be obtained.

Figure 9:
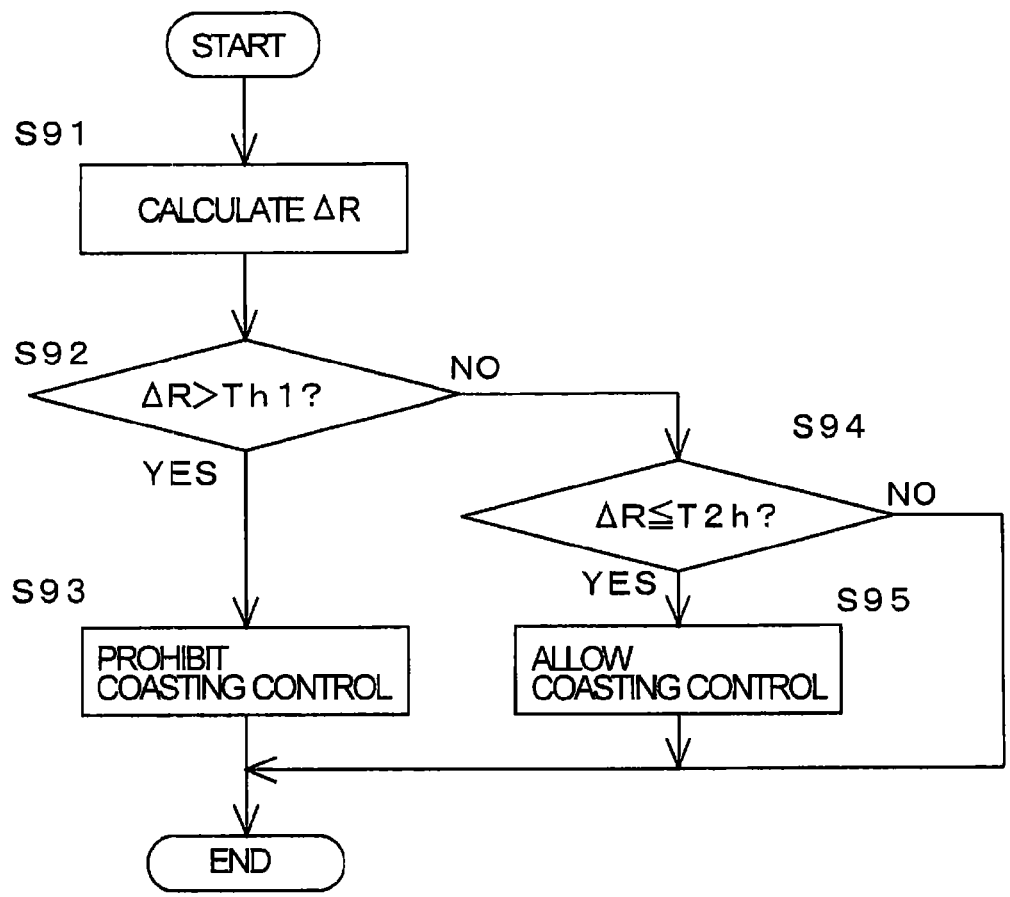
FIG. 9 is a flowchart illustrating procedures of turning recognition and coasting control prohibition during turning in the coasting control device of the present invention.

Subsequently, the turning recognition and the coasting control prohibition during turning in the coasting control device 1 of the present invention will be described by referring to FIG. 9.

At Step S91, the turning recognition unit 4 reads the rotation speeds of the right and left wheels from the ABS control unit 123 and calculates a rotation speed difference $\Delta R$. Then, at Step S92, the turning recognition unit 4 determines whether the rotation speed difference $\Delta R$ exceeds a first threshold value Th1. If YES, since the rotation speed difference $\Delta R$ between the right and left wheels exceeds the first threshold value Th1, it can be recognized that the vehicle is turning. In this case, the routine proceeds to Step S93. At Step S93, the unit 5 for prohibiting coasting control during turning prohibits coasting control.

If it is NO in the determination at Step S92, the routine proceeds to Step S94. At Step S94, the turning recognition unit 4 determines whether the rotation speed difference $\Delta R$ is at a second threshold value Th2 (Th1=Th2+$\alpha$; $\alpha$ is a positive value set in advance on the basis of experiments) or less. If YES, since the rotation speed difference $\Delta R$ between the right and left wheels becomes the second threshold value Th2 or less, it can be recognized that the vehicle is not turning any more. In this case, the routine proceeds to Step 95. At Step 95, the unit 5 for prohibiting coasting control during turning allows coasting control.

If it is NO in the determination at Step S94, the rotation speed difference $\Delta R$ is larger than the second threshold value Th2. If this determination is reached in a state where coasting control is allowed, it means that the rotation speed difference $\Delta R$ becomes the second threshold value Th2 or less once and coating control is allowed and then, becomes larger than the second threshold value Th2, and thus, the routine proceeds to end in order to maintain allowed coasting control. If this determination is reached in a state where coasting control is prohibited, the rotation speed difference $\Delta R$ exceeds the first threshold value Th1 once and coasting control is prohibited and then, the rotation speed difference $\Delta R$ does not become the second threshold value Th2 or less yet, and thus, the routine proceeds to end in order to maintain prohibition of coasting control.

As a result, since coasting control is prohibited while the vehicle is turning, even if the coasting control start conditions as described in FIG. 6 are satisfied, coasting control is not started. Moreover, even if the vehicle starts turning while coasting control has been already executed, coasting control is prohibited, and even if the coasting control end conditions as described in FIG. 6 are not satisfied, coasting control is terminated.

As described above, the coasting control device 1 of the present invention, is configured such that, when it is recognized that the vehicle is turning, the coating control is prohibited, and thus, coasting control does not coincide with or give a bad influence on stabilization control such as ABS control which is important during turning.

According to the coasting control device 1 of the present invention, the turning recognition unit 4 can read information of the rotation speeds of the right and left wheels from the ABS control unit 123 and recognize that the vehicle is turning from the difference in the rotation speeds between the right and left wheels. The steering sensor, yaw rate sensor, G sensor and the like which can be used for recognition of turning are employed for vehicles of relatively high-order models or so-called luxury vehicles, while the ABS control unit 123 is mounted also on vehicles of low-order models or so-called popular vehicles and thus, the present invention can be applied without adding a new sensor.

According to the coasting control device 1 of the present invention, recognition of turning is not made only by comparison between the rotation speed difference $\Delta R$ between the right and left wheels and one threshold value, but if the rotation speed difference $\Delta R$ between the right and left wheels exceeds the first threshold value Th1, it is recognized that the vehicle is turning and then, if the rotation speed difference between the right and left wheels falls to the second threshold value Th2, smaller than the first threshold value Th1, or less, it is recognized that the vehicle is not turning any more. And thus, so-called hysteresis is realized, and hunting that prohibition and allowing of coasting control are frequently repeated is prevented.

The invention claimed is:

1. A coasting control device for a vehicle comprising:
   a coasting control execution unit that recognizes when coasting control start conditions are satisfied, and that disengages a clutch in a driving situation in which an engine does no work for the outside and lowers an engine RPM so as to start coasting control;
   a turning recognition unit that recognizes that the vehicle is turning; and
   a unit for prohibiting the coasting control during the turning that prohibits the coasting control when the turning recognition unit recognizes that the vehicle is turning,
   wherein the unit for prohibiting the coasting control during the turning prohibits the coasting control execution unit from starting the coasting control, even if the coasting control start conditions are satisfied.

2. The coasting control device according to claim 1, wherein
   the turning recognition unit recognizes that the vehicle is turning from a difference in rotation speeds between right and left wheels.

3. The coasting control device according to claim 2, wherein
   the turning recognition unit recognizes that the vehicle starts turning when the difference in rotation speeds between the right and left wheels exceeds a first threshold value and recognizes that the vehicle terminates turning when the difference in rotation speeds between the right and left wheels falls to a second threshold value, which is smaller than the first threshold value, or less.

4. The coasting control device according to claim 3, further comprising:
   a coasting control determination map based on a clutch rotation speed and an accelerator opening degree, wherein
   the coasting control execution unit starts the coasting control by disengaging the clutch and lowering the engine RPM when plotted points of the clutch rotation speed and the accelerator opening degree on the coasting control determination map are within a coasting control available region, an accelerator pedal operation speed is within a predetermined range, and plotted points of the clutch rotation speed and the accelerator opening degree pass a coasting control threshold line in a direction where the accelerator opening degree decreases and terminates the coasting control when the accelerator pedal operation speed goes out of the predetermined range or the plotted points go out of the coasting control available region.

5. The coasting control device according to claim 2, further comprising:
   a coasting control determination map based on a clutch rotation speed and an accelerator opening degree, wherein
   the coasting control execution unit starts the coasting control by disengaging the clutch and lowering the engine RPM when plotted points of the clutch rotation speed and the accelerator opening degree on the coasting control determination map are within a coasting control available region, an accelerator pedal operation speed is within a predetermined range, and plotted points of the clutch rotation speed and the accelerator opening degree pass a coasting control threshold line in a direction where the accelerator opening degree decreases and terminates the coasting control when the accelerator pedal operation speed goes out of the predetermined range or the plotted points go out of the coasting control available region.

6. The coasting control device according to claim 1, further comprising:
   a coasting control determination map based on a clutch rotation speed and an accelerator opening degree, wherein
   the coasting control execution unit starts the coasting control by disengaging the clutch and lowering the engine RPM when plotted points of the clutch rotation speed and the accelerator opening degree on the coasting control determination map are within a coasting control available region, an accelerator pedal operation speed is within a predetermined range, and plotted points of the clutch rotation speed and the accelerator opening degree pass a coasting control threshold line in a direction where the accelerator opening degree decreases and terminates the coasting control when the accelerator pedal operation speed goes out of the predetermined range or the plotted points go out of the coasting control available region.

7. The coasting control device according to claim 1, wherein the turning recognition unit receives rotation speeds of the left and right wheels from an anti-lock braking system control unit mounted on the vehicle and recognizes that the vehicle is turning from a difference in the rotation speeds between the left and right wheels.

8. The coasting control device according to claim 1, wherein the turning recognition unit receives data regarding an operation angle of a steering shaft from a steering sensor in the vehicle to determine if the vehicle is turning.

9. The coasting control device according to claim 1, wherein the turning recognition unit receives data regarding a yaw angle of the vehicle from a yaw rate sensor in the vehicle to determine if the vehicle is turning.

10. The coasting control device according to claim 1, wherein the turning recognition unit receives data regarding lateral acceleration of the vehicle from a G-force sensor in the vehicle to determine if the vehicle is turning.

* * * * *